United States Patent
Rakib et al.

(10) Patent No.: US 12,492,121 B2
(45) Date of Patent: Dec. 9, 2025

(54) CONVERSION OF AMMONIA TO HYDROGEN AND NITROGEN USING AMMONIA AS A SWEEP GAS

(71) Applicant: Saudi Arabian Oil Company, Dhahran (SA)

(72) Inventors: Mohammad Abdur Rakib, Dhahran (SA); Stephen N. Paglieri, Dhahran (SA); Osamah Siddiqui, Dhahran (SA); Sai P. Katikaneni, Dhahran (SA); Kunho Lee, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 538 days.

(21) Appl. No.: 17/978,475

(22) Filed: Nov. 1, 2022

(65) Prior Publication Data
US 2024/0140788 A1    May 2, 2024

(51) Int. Cl.
*C01B 3/04* (2006.01)
*B01D 53/00* (2006.01)
(Continued)

(52) U.S. Cl.
CPC ............ *C01B 3/047* (2013.01); *B01D 53/002* (2013.01); *B01D 53/229* (2013.01); *B01J 8/065* (2013.01);
(Continued)

(58) Field of Classification Search
CPC .... B01D 53/00; B01D 53/002; B01D 53/022; B01D 53/229; B01J 8/00; B01J 8/008; B01J 8/009; B01J 8/02; B01J 8/0207; B01J 8/0214; B01J 8/0242; B01J 8/025; B01J 8/06; B01J 8/065; B01J 8/067;
(Continued)

(56) References Cited

U.S. PATENT DOCUMENTS 7,811,529 B2 * 10/2010 Powell .................... B01J 19/249
                                                           422/187
8,262,755 B2    9/2012 Repasky et al.
(Continued)

FOREIGN PATENT DOCUMENTS

| CN | 111957270 | 11/2020 |
| JP | 2013095618 | 5/2013 |
| KR | 20210119823 | 10/2021 |

OTHER PUBLICATIONS

Abashar, "Multi-stage membrane reactors for hydrogen production by ammonia decomposition," International Journal of Petrochemistry and Research, 2018, 2(1):109, 7 pages.
(Continued)

*Primary Examiner* — Natasha E Young
(74) *Attorney, Agent, or Firm* — Fish & Richardson P.C.

(57) ABSTRACT

The disclosure relates to systems and methods for the production of hydrogen ($H_2$) from ammonia ($NH_3$) in a membrane reactor that include using ammonia as a sweep gas. Ammonia is converted to hydrogen and nitrogen ($N_2$), and the hydrogen is separated from the nitrogen and unreacted ammonia by passing the hydrogen through a hydrogen-permeable membrane while using ammonia as a sweep gas. The ammonia sweep gas can be separated from the permeated hydrogen and continuously recycled.

19 Claims, 14 Drawing Sheets

(51) Int. Cl.
  *B01D 53/22* (2006.01)
  *B01J 8/06* (2006.01)
  *C01B 3/50* (2006.01)
(52) U.S. Cl.
  CPC ............... *B01J 8/067* (2013.01); *C01B 3/503* (2013.01); *C01B 3/506* (2013.01); *B01J 2208/065* (2013.01); *C01B 2203/041* (2013.01); *C01B 2203/046* (2013.01); *C01B 2203/0465* (2013.01)
(58) Field of Classification Search
  CPC .......... B01J 2208/00; B01J 2208/00008; B01J 2208/00017; B01J 2208/00504; B01J 2208/06; B01J 2208/065; C01B 3/00; C01B 3/02; C01B 3/04; C01B 3/047; C01B 3/50; C01B 3/501; C01B 3/503; C01B 3/506; C01B 2203/00; C01B 2203/04; C01B 2203/0405; C01B 2203/041; C01B 2203/046; C01B 2203/0465; C01B 2203/14; C01B 2203/148
  See application file for complete search history.

(56) References Cited

U.S. PATENT DOCUMENTS 8,287,762 B2  10/2012  Repasky et al.
2007/0289215 A1  12/2007  Hemmings et al.

OTHER PUBLICATIONS

Abashar, "The impact of ammonia feed distribution on the performance of a fixed bed membrane reactor for ammonia decomposition to ultra-pure hydrogen," International Journal of Hydrogen Energy, 2019, 44(1):82, 9 pages.

Cechetto et al. "H2 production via ammonia decomposition in a catalytic membrane reactor," Fuel Processing Technology, 2021, 216:106772, 9 pages.

Cerrillo et al., "High purity, self-sustained, pressurized hydrogen production from ammonia in a catalytic membrane reactor," Chemical Engineering Journal, 2022, 431, 134310, 13 pages.

Garcia-Garcia et al., "High purity hydrogen production by low temperature catalytic ammonia decomposition in a multifunctional membrane reactor," Catalysis Communications, 2008, 9(3), 482, 5 pages.

Park et al., "A catalytic composite membrane reactor system for hydrogen production from ammonia using steam as a sweep gas," Journal of Membrane Science, 2020, 614, 118483, 42 pages.

Shah et al., "Compact ammonia reforming at low temperature using catalytic membrane reactors," Journal of Membrane Science, 2022, 644:120147, 25 pages.

Zhang et al., "Efficient Ammonia Decomposition in a Catalytic Membrane Reactor to Enable Hydrogen Storage and Utilization," ACS Sustainable Chemistry & Engineering, 2019, 7(6):5975, 11 pages.

\* cited by examiner

CONVERSION OF AMMONIA TO HYDROGEN AND NITROGEN USING AMMONIA AS A SWEEP GAS

FIELD

The disclosure relates to systems and methods for the production of hydrogen ($H_2$) from ammonia ($NH_3$) in a membrane reactor using ammonia as a sweep gas. Ammonia is converted to hydrogen and nitrogen ($N_2$), and the hydrogen is separated from the nitrogen and unreacted ammonia by passing the hydrogen through a hydrogen-permeable membrane while using ammonia as a sweep gas. The ammonia sweep gas can be separated from the permeated hydrogen and continuously recycled.

BACKGROUND

Ammonia cracking to form hydrogen and nitrogen is a highly endothermic process, favored at higher temperatures and lower pressures. The conversion of ammonia can be increased by the removal of hydrogen from the reaction environment, which can be achieved using a membrane reactor. In general, such a membrane reactor has two compartments, separated by a membrane selectively permeable to hydrogen. The nitrogen and hydrogen formed by cracking ammonia, along with the uncracked ammonia, flow along one side of the membrane. This side of the membrane is referred to as the retentate side of the membrane. Hydrogen flowing on the retentate side of the membrane selectively passes through the membrane and reaches the other side of the membrane. This side of the membrane is referred to as the permeate side of the membrane. The difference in partial pressure of hydrogen between the retentate side of the membrane and the permeate side of the membrane drives the permeation of hydrogen through the membrane. A relatively low partial pressure of hydrogen on the permeate side of the membrane increases hydrogen permeation through the membrane to the permeate side of the membrane. Increasing such hydrogen permeation through the membrane increases the rate of ammonia cracking. The removal of hydrogen from the permeate side can be enhanced by continuously passing a gas (referred to as a sweep gas) along the permeate side of the membrane to reduce the partial pressure of hydrogen on the permeate side of the membrane. Steam or nitrogen is often used as the sweep gas.

SUMMARY

The disclosure relates to systems and methods for the production of hydrogen from ammonia in a membrane reactor that include using ammonia as a sweep gas. Ammonia is converted to hydrogen and nitrogen, and the hydrogen is separated from the nitrogen and unreacted ammonia by passing the hydrogen through a hydrogen-permeable membrane while using ammonia as a sweep gas. The ammonia sweep gas can be separated from the permeated hydrogen and continuously recycled.

Using ammonia as a sweep gas can reduce the amount of materials used and can avoid using additional generation and/or processing infrastructure, at least in part because the ammonia sweep gas can continually be recycled. The ammonia used as the sweep gas can be liquefied at relatively non-severe pressures and moderate sub-ambient temperatures, thereby making it relatively easy to separate the ammonia sweep gas from the produced hydrogen. This can be considered to be like a modified organic Rankine cycle.

A portion of the recycled ammonia and/or unconverted ammonia, nitrogen and hydrogen from the retentate side can be used as a fuel to generate heat for the conversion of ammonia. This can reduce greenhouse gas emissions and improve energy efficiency.

The systems and methods can be used in combination with the transportation of ammonia to overcome challenges associated with shipping hydrogen.

The systems and methods of the disclosure can reduce infrastructure requirements (e.g., infrastructure for generating steam) leading to a decrease in energy needs, system complexity and costs relative to other systems and methods. The systems and methods can reduce corrosion, maintenance and costs associated with the prevention and repair of corrosion due to the traces of ammonia crossing over from the retentate side to the permeate side and generating a corrosive mixture in the presence of steam, relative to systems and methods that include steam as a sweep gas, as traces of ammonia crossing over would not create a corrosive environment due to the absence of steam in the present systems and methods. This also removes the need to separate ammonia from the steam sweep loop before re-using it. The systems and methods can have simpler implementation and improved scalability relative to systems and methods that employ a vacuum to reduce the hydrogen partial pressure.

In a first aspect, the disclosure provides a system, including: a reactor including a first portion and a second portion, the first and second portions separated by a hydrogen-permeable membrane; a first ammonia source configured to be in fluid communication with the first portion of the reactor; and a second ammonia source configured to be in fluid communication with the second portion of reactor.

In some embodiments, the first ammonia source is the same as the second ammonia source.

In some embodiments, the system further includes a heat source. The system is configured so that, during use of the system the first ammonia source supplies ammonia to the first portion of the reactor, the heat source heats the ammonia in the first portion of the reactor so that the ammonia in the first portion of the reactor is converted to hydrogen and nitrogen, the hydrogen passes through the hydrogen-permeable membrane and enters the second portion of the reactor, and the second ammonia source supplies ammonia to the second portion of the reactor in the form of a gas stream that removes the hydrogen from the second portion of the reactor.

In some embodiments, the system further includes a first cylinder including the hydrogen-permeable membrane and a second cylinder that surrounds the first cylinder.

In some embodiments, an interior space of the first cylinder defines the first portion of the reactor, and an annular space formed between an exterior surface of the first cylinder and an interior surface of the second cylinder defines the second portion of the reactor.

In some embodiments, an interior space of the first cylinder defines the second portion of the reactor, and an annular space formed between an exterior surface of the first cylinder and an interior surface of the second cylinder defines the first portion of the reactor.

In some embodiments, the system includes a plurality of first and second cylinders.

In some embodiments, the system further includes a catalyst disposed in the first portion of the reactor.

In some embodiments, the hydrogen-permeable membrane includes a planar hydrogen-permeable membrane.

In some embodiments, the system further includes a cooler, a compressor, and a condenser in fluid communication with an outlet of the second portion of the reactor.

In some embodiments, the system further includes a separator, capable of separating ammonia and hydrogen, in fluid communication with an outlet of the condenser. The ammonia from the separator forms a third ammonia source.

In some embodiments, the third ammonia source includes a contaminant, and the contaminant is removed from the third ammonia source.

In some embodiments, the third ammonia source is configured to be in fluid communication with the second portion of reactor.

In some embodiments, the third ammonia source supplies ammonia to the second portion of the reactor in the form of a gas stream that removes the hydrogen from the second portion of the reactor.

In a second aspect, the disclosure provides a method, including converting ammonia to hydrogen and nitrogen, passing the hydrogen through a hydrogen-permeable membrane, and contacting the hydrogen that has passed through the hydrogen-permeable membrane with a first stream of ammonia to displace at least a portion of the hydrogen from a region adjacent the hydrogen-permeable membrane.

In certain embodiments, the method further includes an ammonia source. A first portion of the ammonia source is converted to hydrogen and nitrogen and a second portion of the ammonia source forms the first stream of ammonia.

In certain embodiments, the method further includes separating the ammonia and hydrogen displaced from the region adjacent the hydrogen-permeable membrane to form a second stream of ammonia and a stream of hydrogen, and contacting the hydrogen that has passed through the hydrogen-permeable membrane with the second stream of ammonia to displace at least a portion of the hydrogen from a region adjacent the hydrogen-permeable membrane.

In certain embodiments, the second stream of ammonia includes a contaminant, and the contaminant is removed from the second stream of ammonia prior to contacting the hydrogen that has passed through the hydrogen-permeable membrane with the second stream of ammonia.

In certain embodiments, separating ammonia and hydrogen includes condensing the ammonia.

In certain embodiments, the method further includes performing a process simulation to determine at least one parameter selected from the group consisting of a temperature for condensing the ammonia, and a pressure for condensing the ammonia.

DETAILED DESCRIPTION

The conversion of ammonia to hydrogen and nitrogen is depicted in reaction (1) and the boiling point of pure ammonia at various pressures is shown in Table 1.

$$NH_3 \rightleftharpoons \frac{1}{2}N_2 + \frac{3}{2}H_2 \tag{1}$$

$$\Delta H^0_{298} = 54.6 \text{ kJ/mol}$$

TABLE 1

Boiling points of pure ammonia at different pressures

| Pressure (barg) | Boiling point (° C.) |
|---|---|
| 5 | 9.5 |
| 10 | 28 |
| 15 | 43 |

Generally, heat is supplied to the reaction environment to sustain a desired rate of conversion and enhance the extent of conversion.

Figure 1:
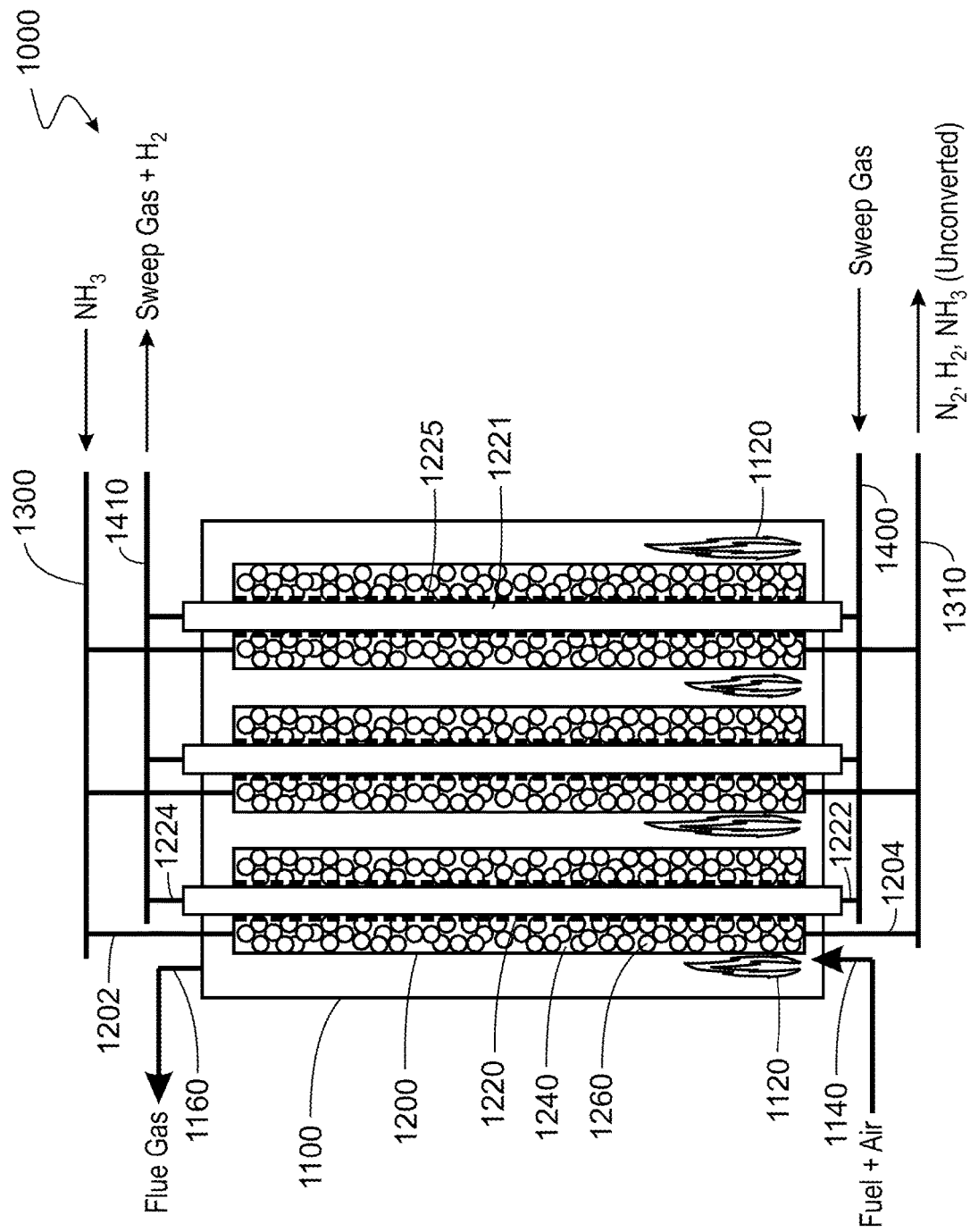
FIG. 1 depicts a schematic of a system.

FIG. 1 depicts a system 1000 that includes a reactor 1100 that includes a plurality of tubes 1200. Disposed in each tube 1200 is a core tube 1220. The active section of the core tube 1220 is composed of a hydrogen-permeable membrane 1225 selectively permeable to hydrogen (depicted with dashed lines). The exterior surface of the core tube 1220 and the interior surface of the tube 1200 form an annular space 1240. A catalyst 1260 capable of converting ammonia to hydrogen and nitrogen is disposed in the annular space 1240. Hydrogen generated in the annular space 1240 can permeate through the hydrogen-permeable membrane 1225 of the core tube 1220 to enter an interior space 1221 of the core tube 1220.

The reactor 1100 includes a series of heat sources 1120 used to drive the endothermic conversion of ammonia to hydrogen and nitrogen. The reactor 1100 includes an inlet 1140 to permit the entry of fuel and air for the heat sources 1120 into the reactor 1100 and an outlet 1160 to permit the removal of flue gas from the reactor 1100.

The system 1000 also includes a gas stream 1300 containing ammonia to be converted to hydrogen and nitrogen. The gas stream 1300 is in fluid communication with the annular spaces 1240 via inlets 1202. A gas stream 1310 removes nitrogen generated from the conversion of ammonia, as well as any unpermeated hydrogen and unconverted ammonia from the annular spaces 1240 of the tubes 1200 via outlets 1204.

The system 1000 further includes a gas stream 1400 carrying a sweep gas containing ammonia. In some embodiments, the sweep gas consists entirely of ammonia. The gas stream 1400 is in fluid communication with the interior spaces 1221 of the core tubes 1220 via inlets 1222. A gas stream 1410 removes the sweep gas and hydrogen (that has permeated into the interior space 1221 through the hydrogen-permeable membrane of the core tube 1220) from the interior space 1221.

In some embodiments, using ammonia as the sweep gas can result in relatively high conversions of ammonia to hydrogen and nitrogen. For example, in certain embodiments, at least 98% (e.g., at least 99%, at least 99.5%) of the ammonia is converted to hydrogen and nitrogen.

Without wishing to be bound by theory, it is believed that a condensable diluent in the gas stream 1400 (i.e., the ammonia sweep gas) can build up as impurities in the ammonia sweep gas loop. Additionally, a non-condensable diluent (e.g. nitrogen) can impact the hydrogen product purity, and should not be present. In some embodiments, the concentration of a condensable and/or non-condensable diluent in the gas stream 1400 is at most 1 (e.g., at most 0.5, at most 0.1, at most 0.05, at most 0.01) vol. %.

Generally, the hydrogen-permeable membrane 1225 is selectively permeable to hydrogen while allowing minimal (e.g., no) permeation of certain other gases, such as ammonia and/or nitrogen. The hydrogen-permeable membrane 1225 may be fabricated from any appropriate material. In some embodiments, a hydrogen permeable membrane is formed of one or more palladium-based alloys (e.g., palladium alloys with silver, gold, and/or copper).

Examples of the catalyst 1600 for the conversion of ammonia to hydrogen and nitrogen include nickel-based catalysts, cobalt-based catalysts and ruthenium-based catalysts. In some embodiments, a nickel-based catalyst for the conversion of ammonia to hydrogen and nitrogen can be operated at temperatures of at least 850 (e.g., at least 900) ° C. and/or at most 950 (e.g., at most 900) ° C. In some embodiments, a ruthenium-based catalyst and/or a cobalt-based catalyst for the conversion of ammonia to hydrogen and nitrogen can be operated at temperatures of at least 400 (e.g., at least 450, at least 500, at least 550, at least 600) ° C. and/or at most 650 (e.g., at most 600, at most 550, at most 500, at most 450) ° C.

In some embodiments, the conversion of ammonia to hydrogen and nitrogen can be performed at space velocities of at least 1,000 (e.g., at least 2,000, at least 5,000, at least 10,000, at least 15,000, at least 20,000, at least 25,000, at least 30,000, at least 35,000, at least 40,000, at least 45,000) $h^{-1}$ and/or at most 50,000 (e.g., at most 45,000, at most 40,000, at most 35,000, at most 30,000, at most 25,000, at most 20,000, at most 15,000, at most 10,000, at most 5,000, at most 2,000) $h^{-1}$.

In some embodiments, the differential hydrogen partial pressure between the permeate and retentate sides is at least 1 (e.g., at least 2, at least 5, at least 10, at least 15, at least 20, at least 25, at least 30, at least 35, at least 40) bars and/or at most 45 (e.g., at most 40, at most 35, at most 30, at most 25, at most 20, at most 15, at most 10, at most 5, at most 2) bars.

As shown in FIG. 1, the flow of ammonia through the annular space 1240 is counter to the flow of sweep gas through the interior space 1221 of the core tube 1220. Countercurrent flow of the sweep gas can increase the hydrogen permeation by creating the a relatively large differential in the hydrogen partial pressure between the retentate and permeate sides of the hydrogen-permeable membrane 1225 relative to other flow configurations.

Figure 2:
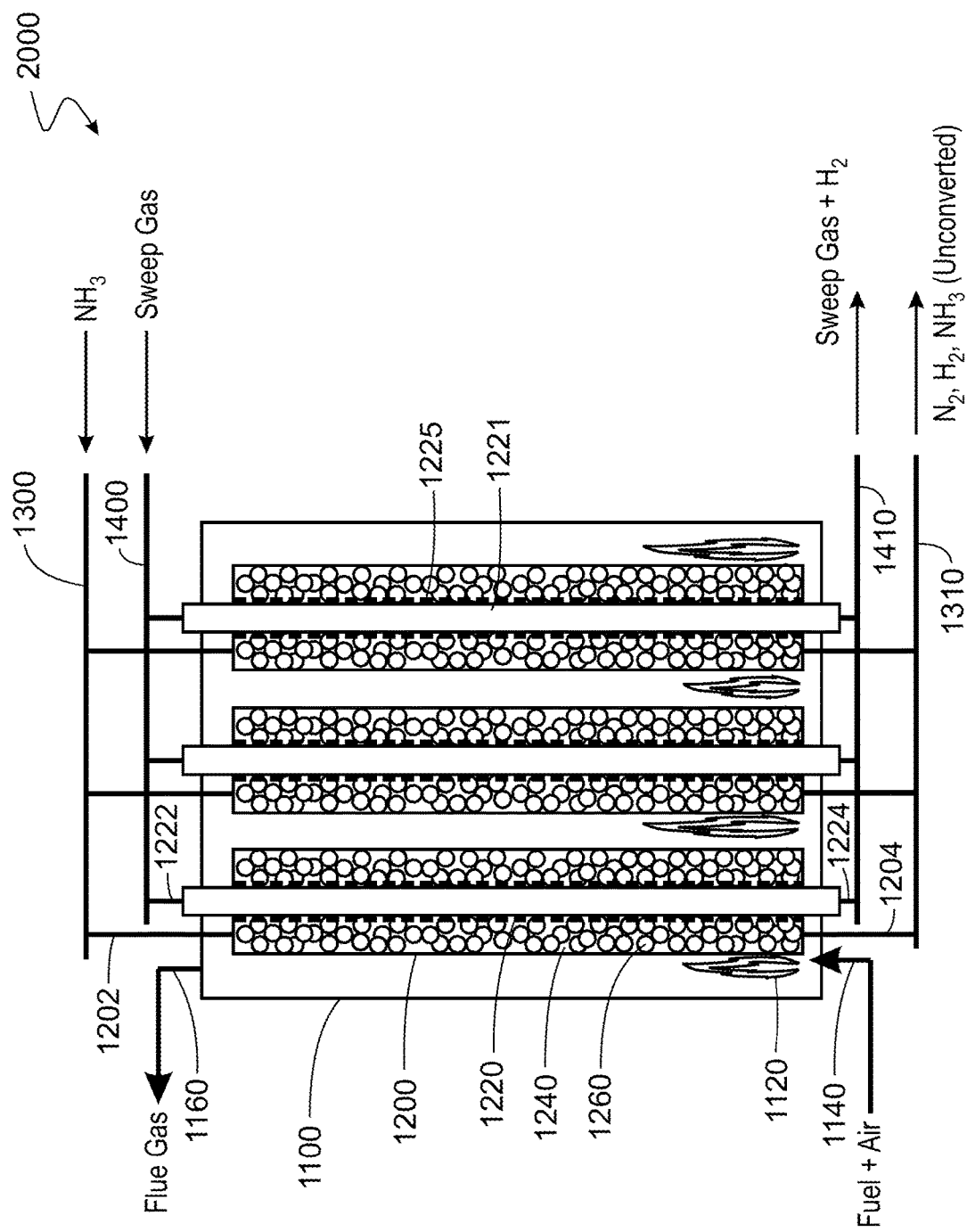
FIG. 2 depicts a schematic of a system.

FIG. 2 depicts a system 2000 that includes the components of the system 1000. However, unlike in the system 1000, the flow of ammonia through the annular space 1240 is the same direction to the flow of sweep gas through the interior space 1221 of the core tube 1220. Thus the gas stream 1400 and the inlets 1222 of the interior space 1221 of the core tube 1220 are on the same side of the reactor 1100 as the gas stream 1300 and the inlets 1202 of the annular space 1240. Similarly, the gas stream 1410 and the outlets 1224 of the interior space 1221 of the core tube 1220 are on the same side of the reactor 1100 as the gas stream 1310 and the outlets 1204 of the annular space 1240.

Figure 3:
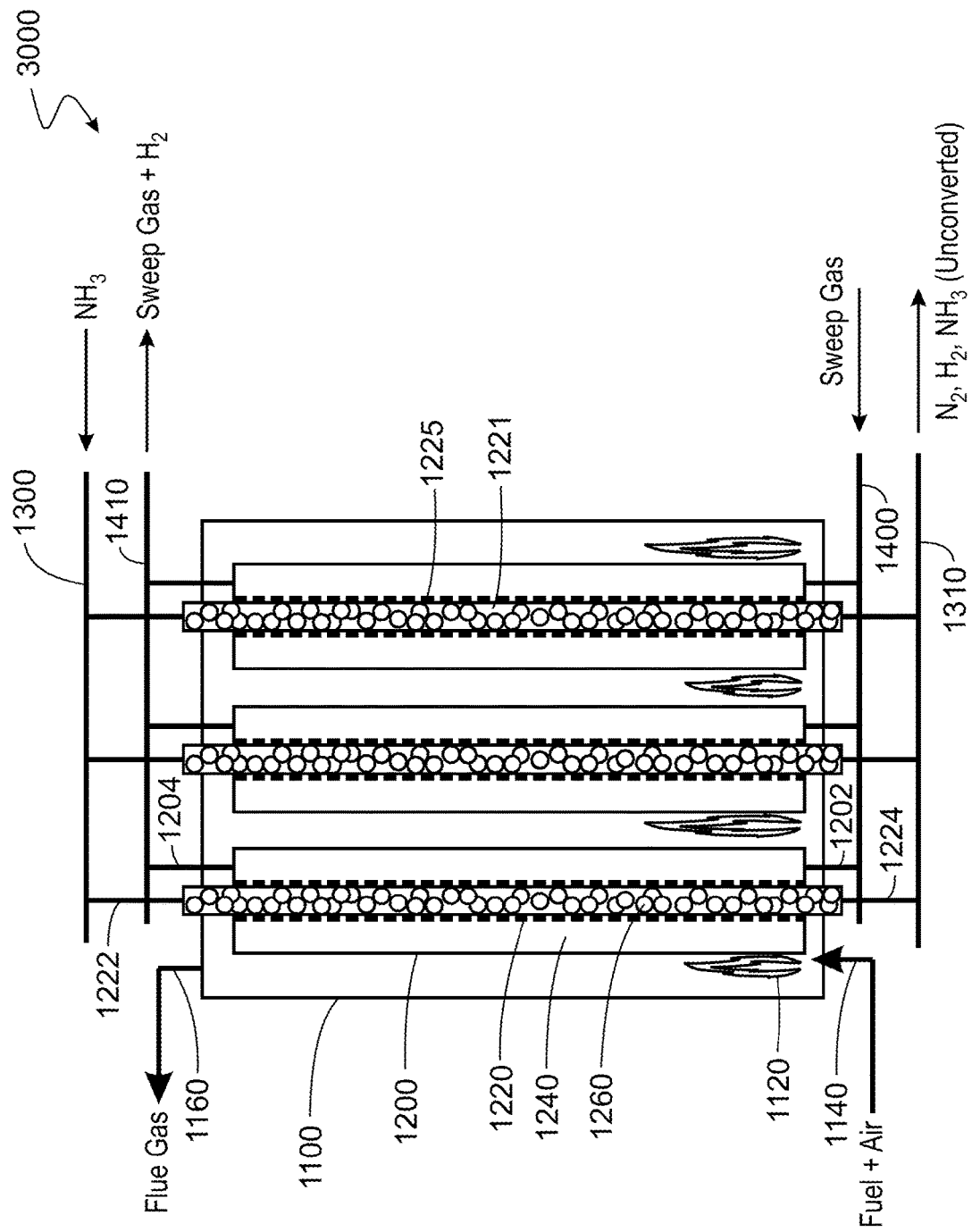
FIG. 3 depicts a schematic of a system.

FIG. 3 depicts a system 3000 that includes the components of the system 1000. However, unlike the system 1000, the system 3000 includes the catalyst 1260 in the interior space 1221 of the core tube 1220, rather than in the annular space 1240. Here, the reaction to convert ammonia to hydrogen and nitrogen occurs in the interior space 1221 of the core tube 1220 and the hydrogen generated permeates from the interior space 1221 of the core tube 1220 to the annular space 1240 through the active area of the hydrogen-permeable membrane 1225 of the core tube 1220. Thus, the gas stream 1300 containing ammonia to be converted is in fluid communication with the interior space 1221 of the core tube 1220 via the inlet 1222 and the gas stream 1310 to remove the unpermeated hydrogen, nitrogen and unconverted ammonia is in fluid communication with the interior space 1221 of the core tube 1220 via the outlet 1224. The gas stream 1400 carrying the sweep gas is in fluid communication with the annular space 1240 via the inlet 1202 and the gas stream 1410 carrying the sweep gas and hydrogen that has permeated into the annular space 1240 through the hydrogen-permeable membrane 1225 of the core tube 1220 is in fluid communication with the annular space 1240 via the outlet 1204.

Figure 4:
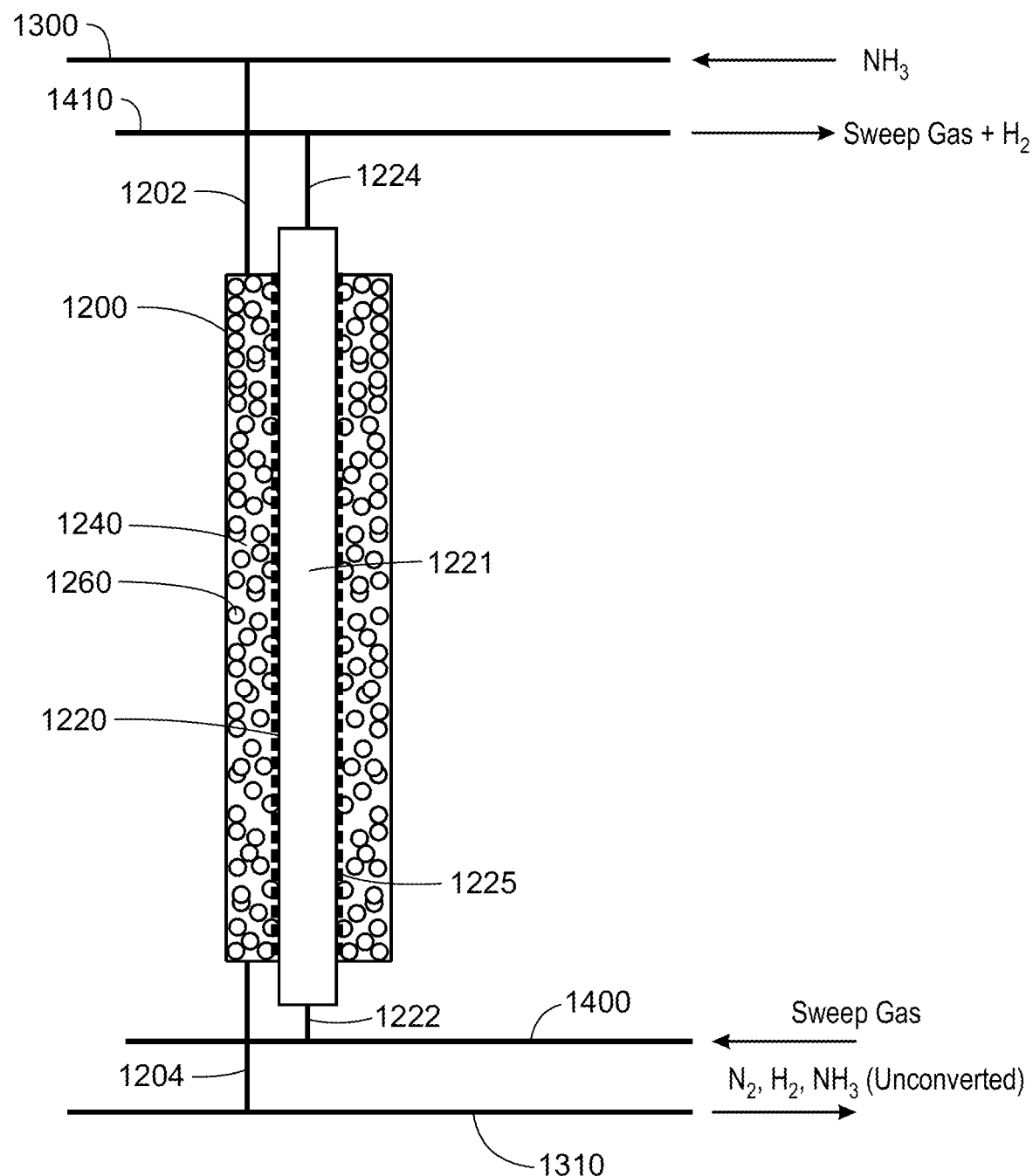
FIG. 4 depicts a schematic of a system.

FIG. 4 depicts a single tube 1200 and the gas streams 1300, 1310, 1400 and 1410 as described above. The walls of the core tube 1220 are composed of a hydrogen-permeable membrane 1225 (described above as active membrane surface) selectively permeable to hydrogen.

Figure 5:
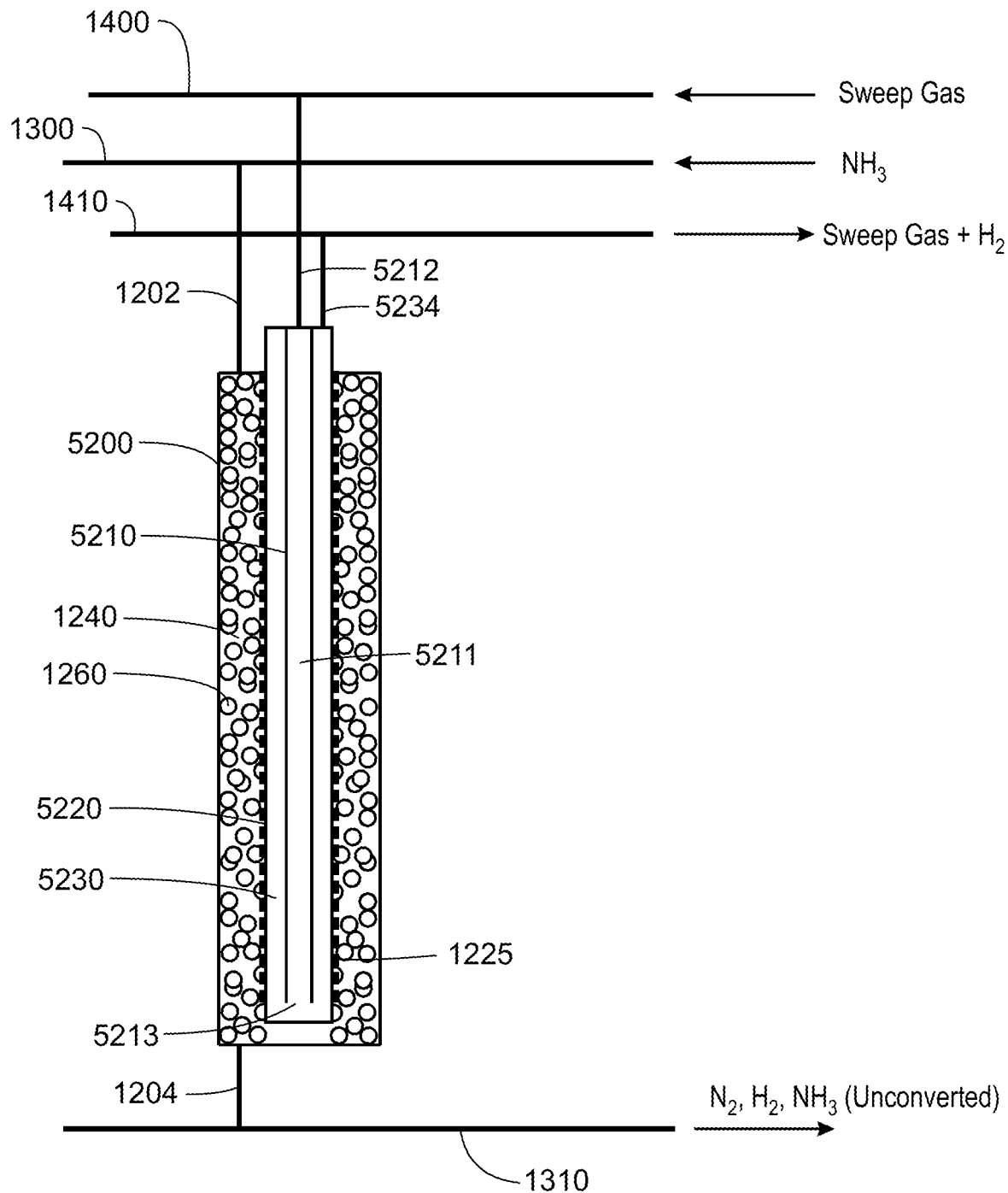
FIG. 5 depicts a schematic of a system.

FIG. 5 shows an alternative configuration of a single tube 5200 that may optionally be used in systems and methods according to the disclosure. Rather than having a core tube 1220, the tube 5200 has an inner tube 5210 and a permeation tube 5220. An annular space 5230 is formed between the interior of the permeation tube 5220 and the outer surface of the inner tube 5210. Hydrogen generated by the conversion of the ammonia in the annular space 1240 permeates through the hydrogen-permeable membrane 1225 of the permeation tube 5220 to enter the annular space 5230. The inner tube 5210 has an inner space 5211 in fluid communication with the gas stream 1400 containing the sweep gas via the inlet 5212. The tube 5200 is configured such that sweep gas enters the inner space 5211 of the inner tube 5210 and exits the inner tube 5210 via the opening 5213 to enter the annular space 5230. The sweep gas and hydrogen are then collected through the gas stream 1410 via the outlet 5234, which provides fluid communication between the annular space 5230 and the gas stream 1410. An advantage of the tube 5200 is that the hydrogen product header is on the same side as the sweep gas header. This allows the hydrogen-permeable membranes 1225 to expand and contract freely when there are temperature changes (e.g. during startup and shutdowns) and simplifies the design of the module as the plumbing of the sweep gas loop will be on the same side of the reactor. Additionally, a countercurrent flow of sweep gas is applied against the process gas flow.

Figure 6:
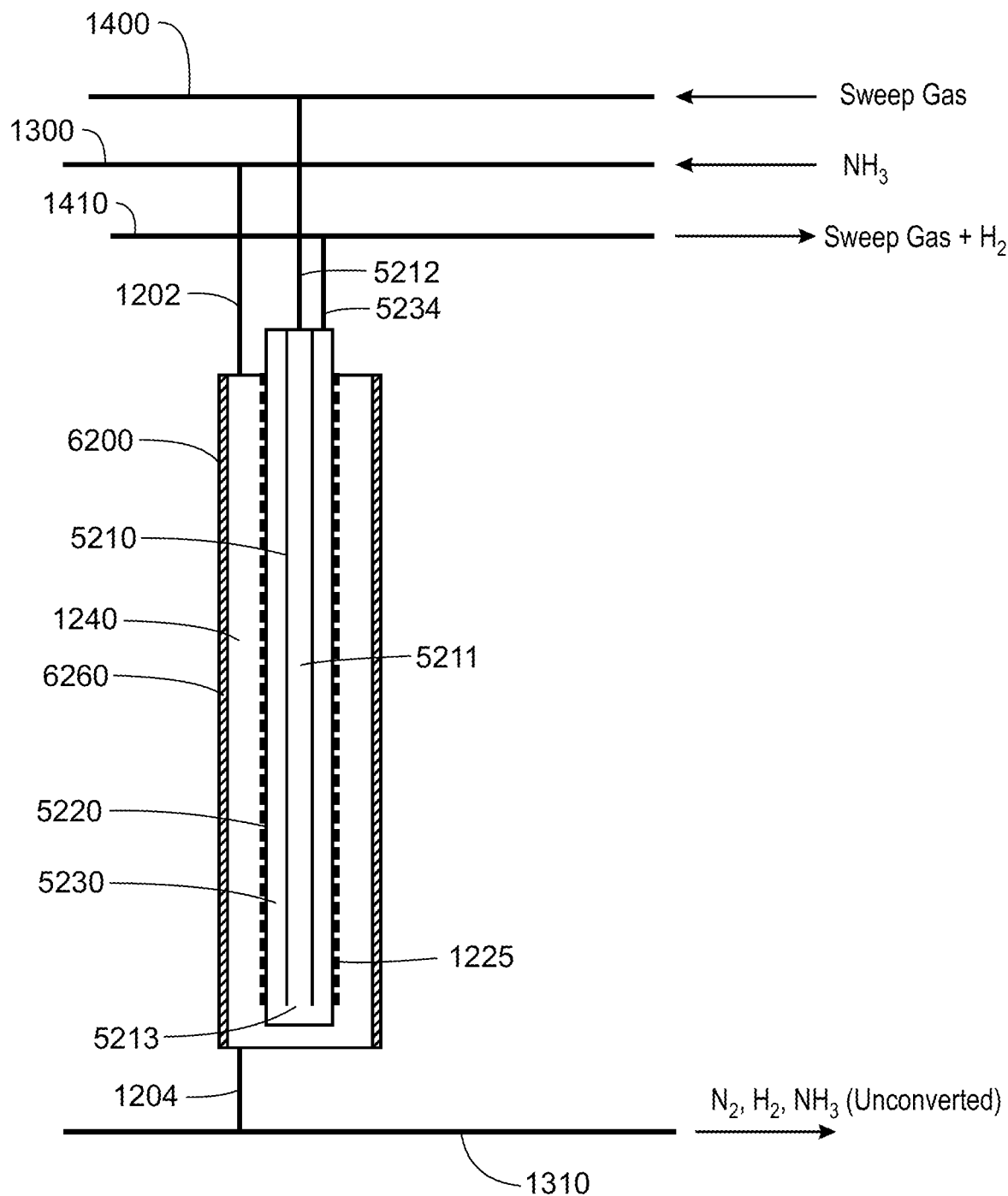
FIG. 6 depicts a schematic of a system.

FIG. 6 shows an alternative configuration of a single tube 6200. Here, a catalyst 6260 is coated on the walls of the tube 6200 rather than being disposed within the annular space 1240.

Figure 7:
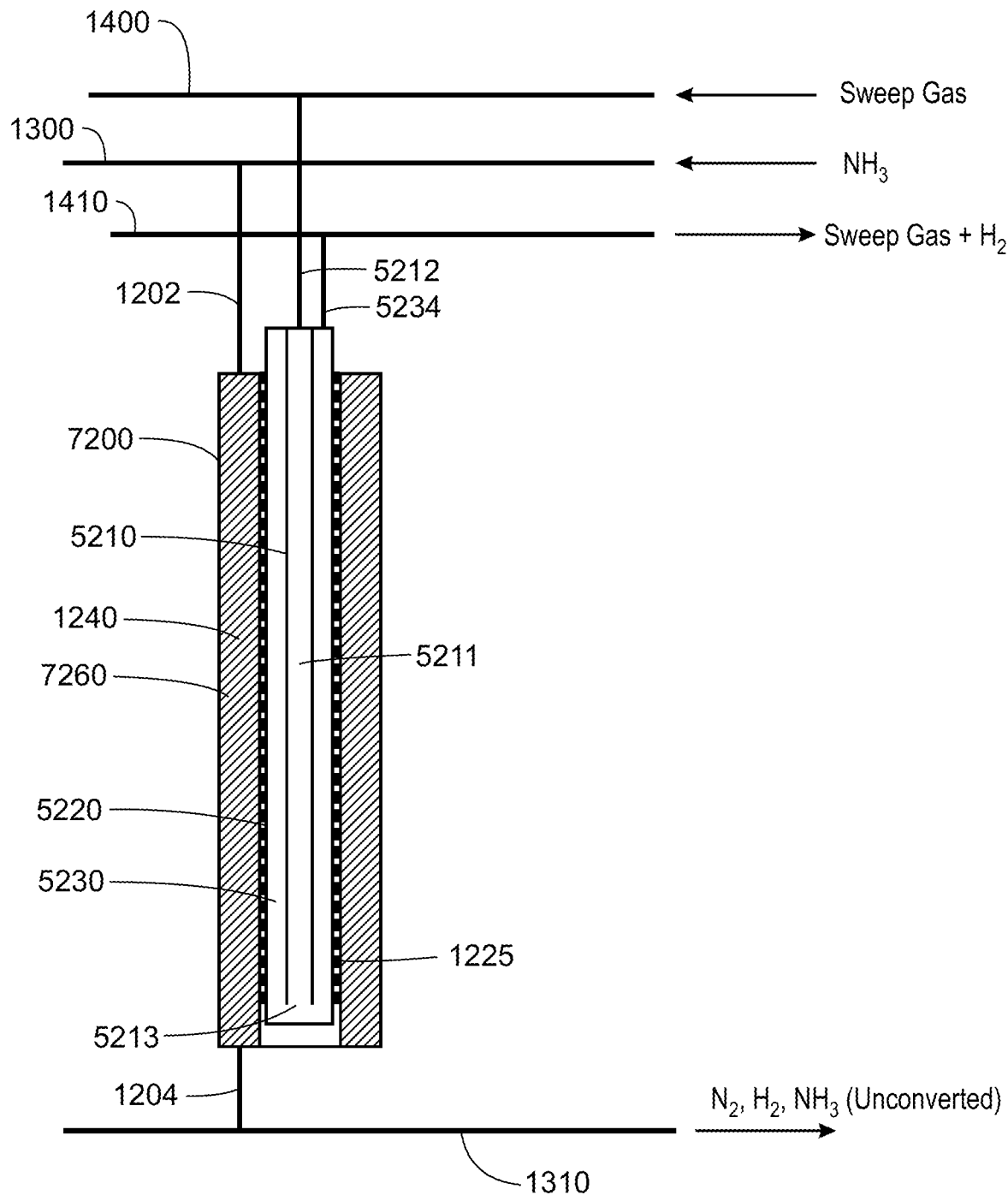
FIG. 7 depicts a schematic of a system.

FIG. 7 shows an alternative configuration of a single tube 7200. Here, a catalyst 7260 is structured within the annular space 1240. Examples of structured catalysts include catalytic or catalyst coated metal or ceramic foams, and monoliths.

Figures 8A, 8B:
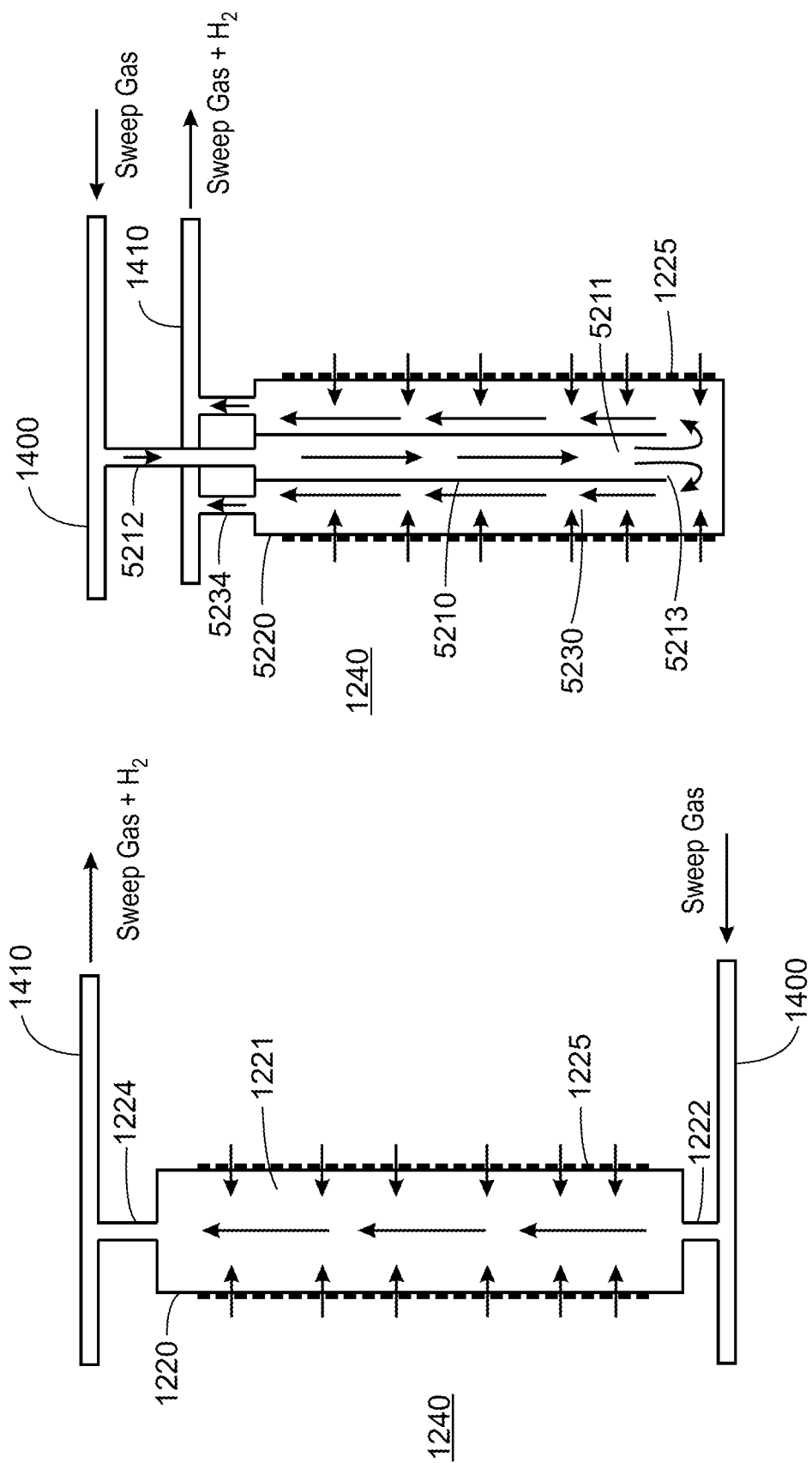
FIG. 8A depicts a schematic of a system.
FIG. 8B depicts a schematic of a system.

FIGS. 8A and 8B depict gas flow through certain embodiments of tubes described herein.

FIG. 8A depicts the flow of both the hydrogen formed by ammonia conversion and the ammonia sweep gas in a portion of the tube 1200 and the gas streams 1400 and 1410 (FIG. 4). Hydrogen permeates from the annular space 1240 through the hydrogen-permeable membrane 1225 of the core tube 1220 into the interior space 1221 of the core tube 1220. Sweep gas passes from the gas stream 1400 to the interior space 1221 of the core tube 1220 via the inlet 1222. Sweep gas and hydrogen exit the interior space 1221 of the core tube 1220 to the gas stream 1410 via the outlet 1224.

FIG. 8B shows the flow of hydrogen and sweep gas in a portion of the tubes 5200, 6200 and/or 7200 and the gas streams 1400 and 1410. Hydrogen permeates from the annular space 1240 through the hydrogen-permeable membrane 1225 of the permeation tube 5220 to the annular space 5230. Sweep gas passes from the gas stream 1400 to the inner space 5211 of the inner tube 5210 and exits the inner tube 5210 via the opening 5213 to the annular space 5230. Sweep gas and hydrogen exit the annular space 5230 via the outlets 5234.

Generally, the systems 1000, 2000 and 3000 can contain the tubes 1200, 5200, 6200 and/or 7200.

Figure 9:
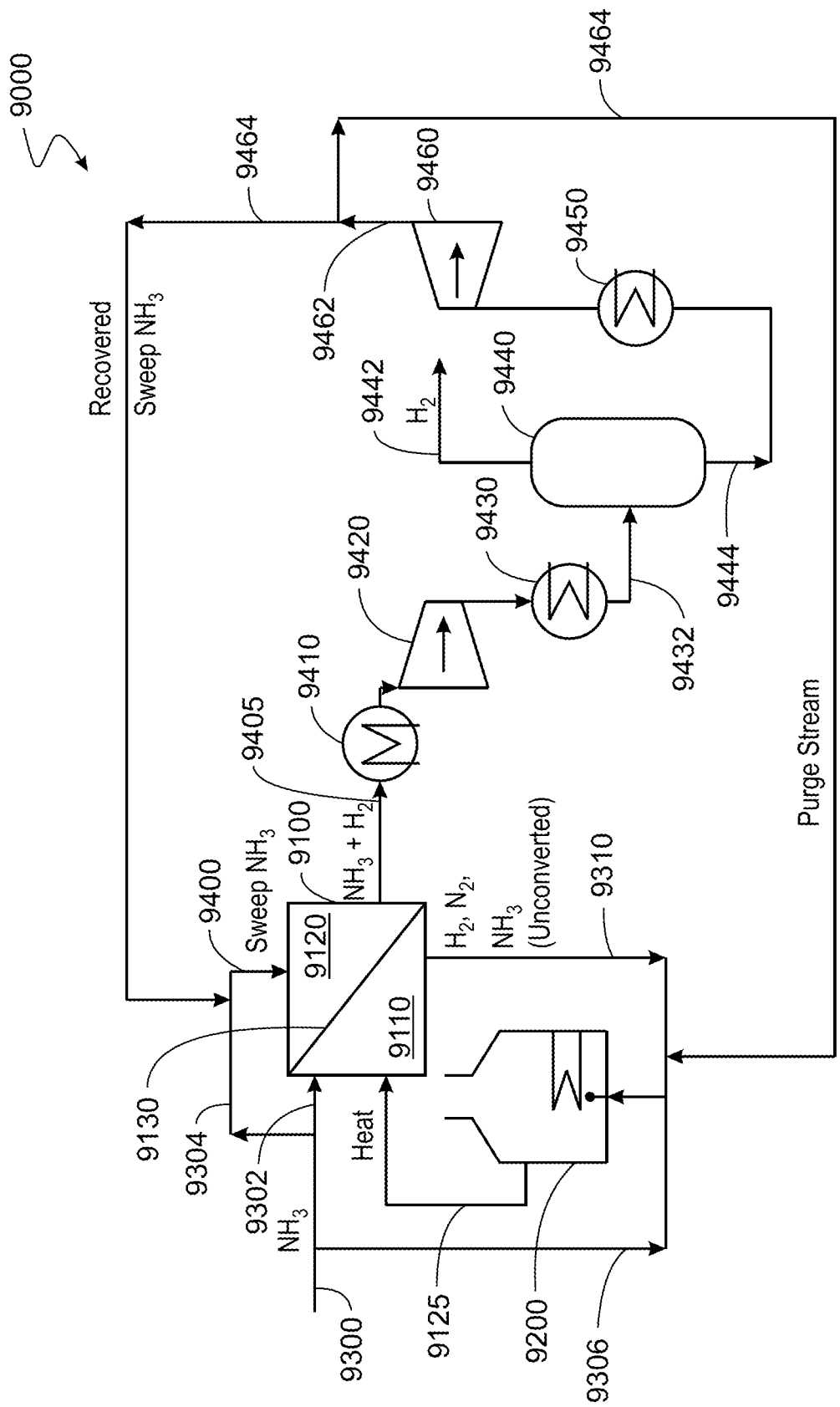
FIG. 9 depicts a schematic of a system.

FIG. 9 shows a system 9000 for converting ammonia to hydrogen while using ammonia as a sweep gas. A stream 9300 of ammonia is separated into a first stream 9302, which is input into a reaction side 9110 of a reactor 9100 where conversion of ammonia to hydrogen occurs. Hydrogen permeates through the membrane 9130 of the reactor 9100 to the permeate side 9120 of the reactor 9100. A second portion 9304 of the stream 9300 is used to form the stream 9400 which is used as an ammonia sweep stream in the permeate side 9120 of the reactor 9100.

Nitrogen, unpermeated hydrogen, and unconverted ammonia are removed from the reaction side 9110 of the reactor 9100 and combined with a third portion 9306 of the stream 9300 and fed into a furnace 9200. The furnace 9200 generates heat 9220, which is sent to the reactor 9100.

Ammonia and hydrogen are removed from the permeate side 9120 of the reactor 9100 via the stream 9405 and sent to a cooler 9410 to cool the stream 9405. The output of the cooler 9410 is sent to a compressor 9420. The output of the compressor 9420 is sent to a condenser 9430. The stream 9432 output from the condenser 9430 is sent to a separator 9440 which separates the stream 9432 into the streams 9442 and 9444. The stream 9442 contains the hydrogen generated from the conversion of ammonia while the stream 9444 is the liquid stream that contains the ammonia. The ammonia can then be heated and depressurized before being recycled back to the membrane reactor as a sweep gas. The stream 9444 is sent to a heat exchanger 9450. The output of the heat exchanger 9450 is sent to an expander 9460. The stream 9462 exits the expander 9460 and is split into two streams 9464 and 9466. The stream 9464 contains ammonia which is combined with the second portion 9304 of the stream 9300 to form the stream 9400 used as the ammonia sweep stream in the permeate side 9120 of the reactor 9100. The stream 9466 is a purge stream removed from the stream 9462 in order to prevent the accumulation of inerts and contaminants. The stream 9466 is combined with the third portion 9306 of the stream 9300 (the fresh ammonia feed stream) and the stream 9310 and fed into the furnace 9200 to provide supplemental energy.

Figure 10:
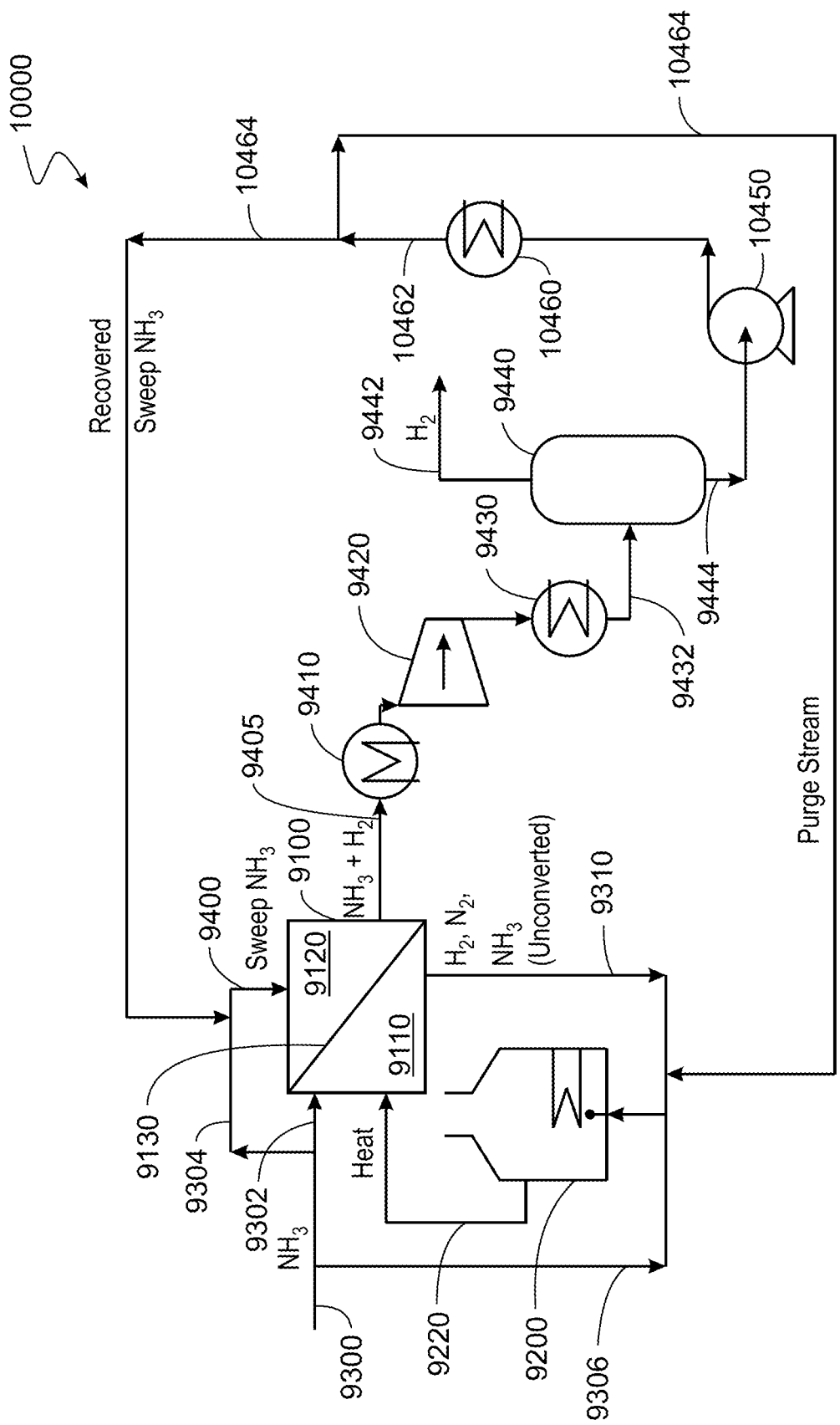
FIG. 10 depicts a schematic of a system.

FIG. 10 shows a system 10000 for converting ammonia to hydrogen while using ammonia as a sweep gas that includes the components of the system 9000. However, unlike the system 9000, the system 10000 contains a pump 10450 and a vaporizer 10460 rather than a heat exchanger 9450 and an expander 9460, to maintain a high permeate pressure. The stream 9444, containing liquid ammonia condensed out from the separator 9440, is pumped to increase the pressure back to the desired value, followed by heating to generate gaseous ammonia for the sweep gas. The pump 10450 receives the stream 9444 from the separator 9440. The output of the pump 10450 is sent to the vaporizer 10460. The stream 10462 exits the vaporizer 10460 and is split into two streams 10464 and 10466. The stream 10464 contains ammonia which is combined with the second portion 9304 of the stream 9300 to form the stream 9400 used as the ammonia sweep stream in the permeate side 9120 of the reactor 9100. The stream 10466 is a purge stream removed from the stream 10462 in order to prevent the accumulation of inerts and contaminants. The stream 10466 is combined with the third portion 9306 of the stream 9300 and the stream 9310 and fed into the furnace 9200 to provide supplemental energy. A sufficiently high flow rate of ammonia has to be maintained to achieve low hydrogen partial pressure in the permeate side 9120. In some embodiments, the ratio of the flow rate of ammonia to the flow rate of hydrogen in stream 9405 is at least 0.5 (e.g., at least 1, at least 1.5, at least 2, at least 3, at least 4, at least 5).

In some embodiments, the reactor 9100 corresponds to the system 1000, 2000 and/or 3000. In some embodiments, the reactor 9100 includes the tubes 1200, 5200, 6200 and/or 7200. In some embodiments, the reaction side 9110 of the reactor 9100 corresponds to the annular space 1240 of the system 1000. In some embodiments, the permeate side 9120 of the reactor 9100 corresponds to the interior space 1221 of the core tube 1220.

In certain embodiments, the furnace 9200 is a gas-fired heater. In certain embodiments, a stream of natural gas is introduced to the furnace 9200 to control $NO_x$ emissions and/or supplement an energy deficit for the reaction. In certain embodiments, heat can be recovered from the flue gas exhaust to maximize the energy efficiency of the system. Without wishing to be bound by theory, a fuel composition including of ammonia, hydrogen and natural gas can help minimize $NO_x$ formation.

Generally, ammonia can be separated from the permeate stream to yield hydrogen with a targeted purity (e.g., at least 99.5 vol. % hydrogen after removal of ammonia). The temperature and/or pressure to separate ammonia and hydrogen can be estimated using any process simulation software (e.g. Aspen HYSYS, Aspen Plus etc.) with an appropriate thermodynamic property package.

Without wishing to be bound by theory, it is believed that relatively minor (e.g., ppm) levels of impurities in the stream 9300 generally will not impact the driving force for hydrogen permeation through the membrane, and hence the membrane performance.

Examples

Figure 11:
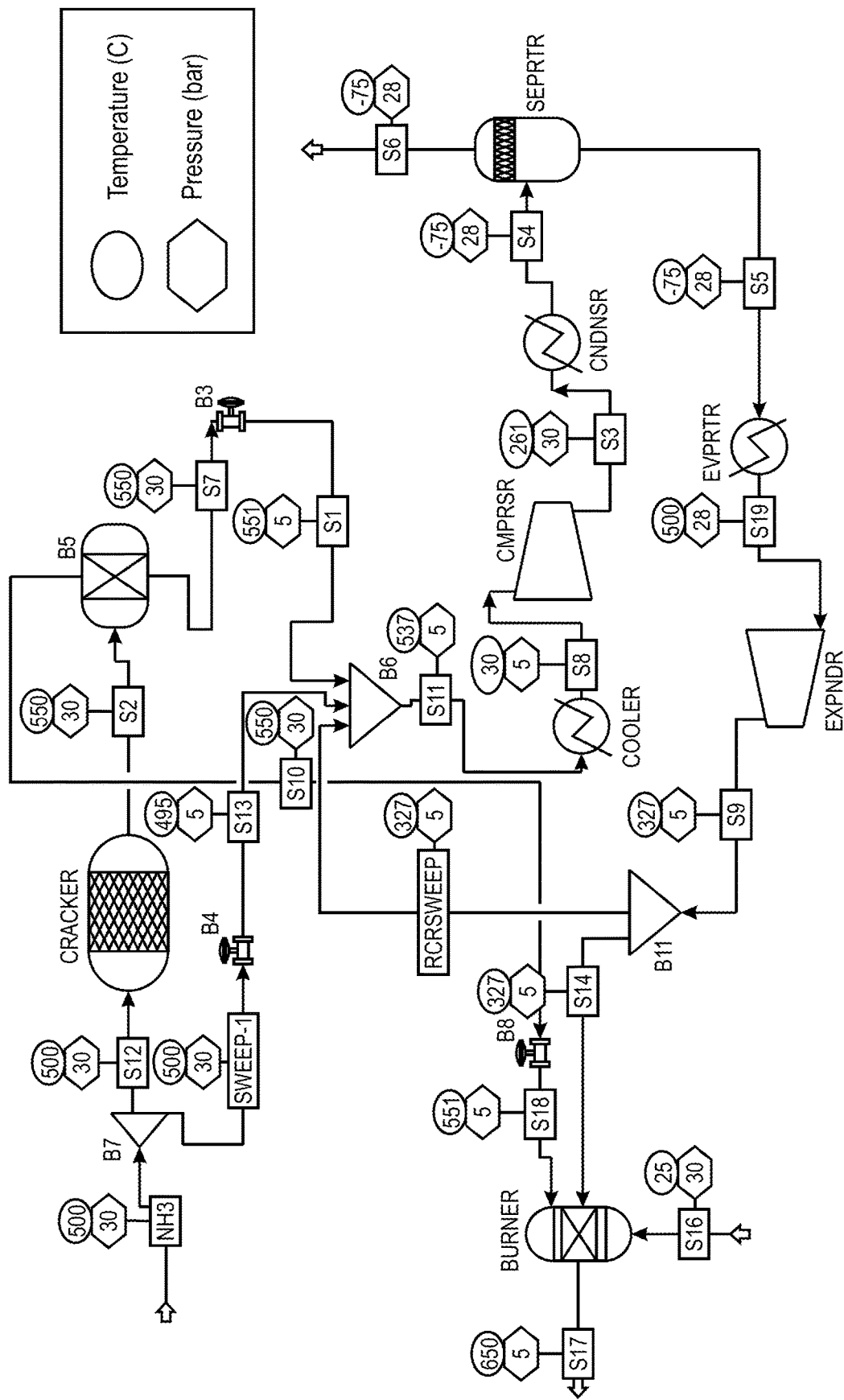
FIG. 11 depicts a schematic of a system used in a simulation.
Figure 12:
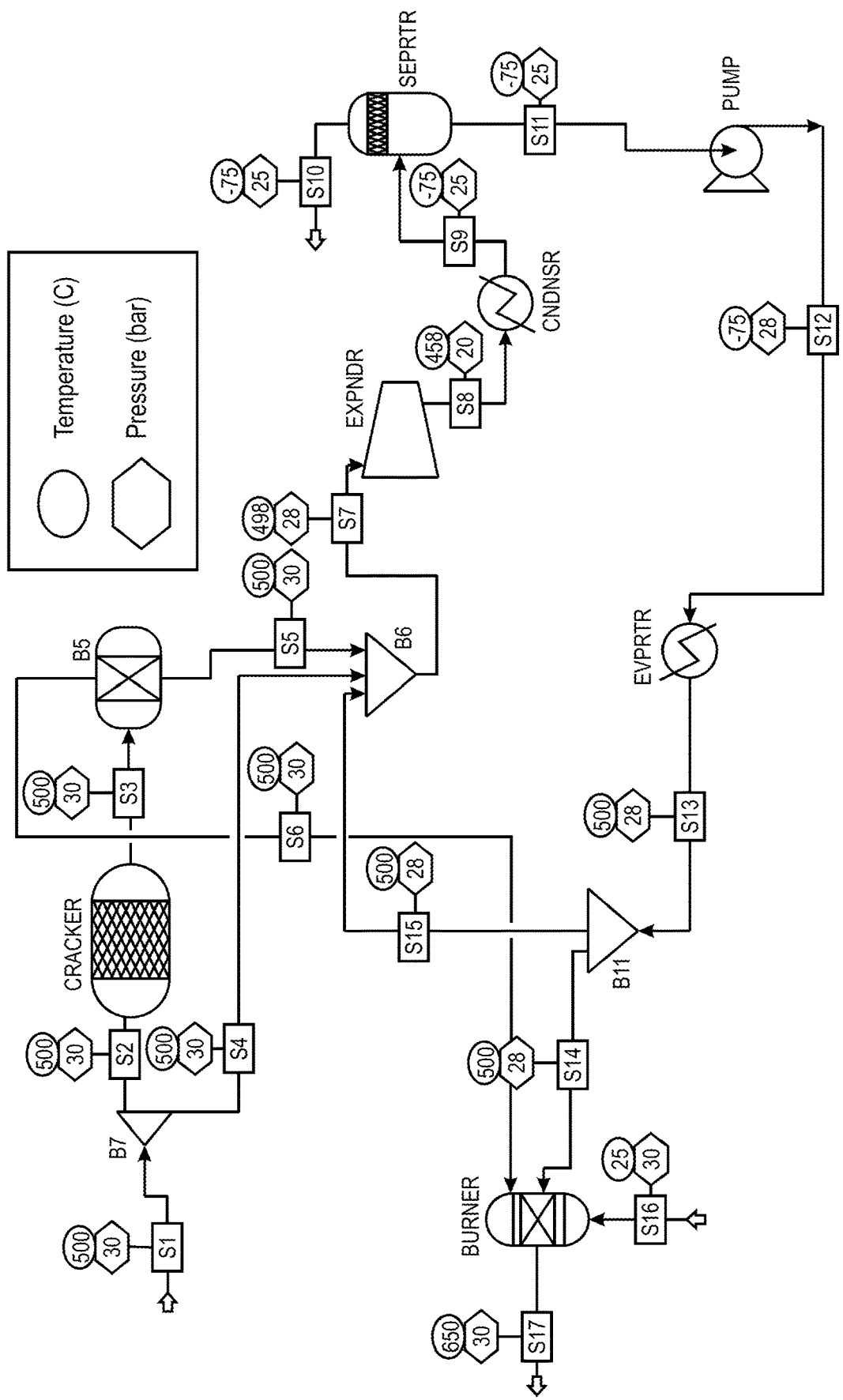
FIG. 12 depicts a schematic of a system used in a simulation.
Figure 13:
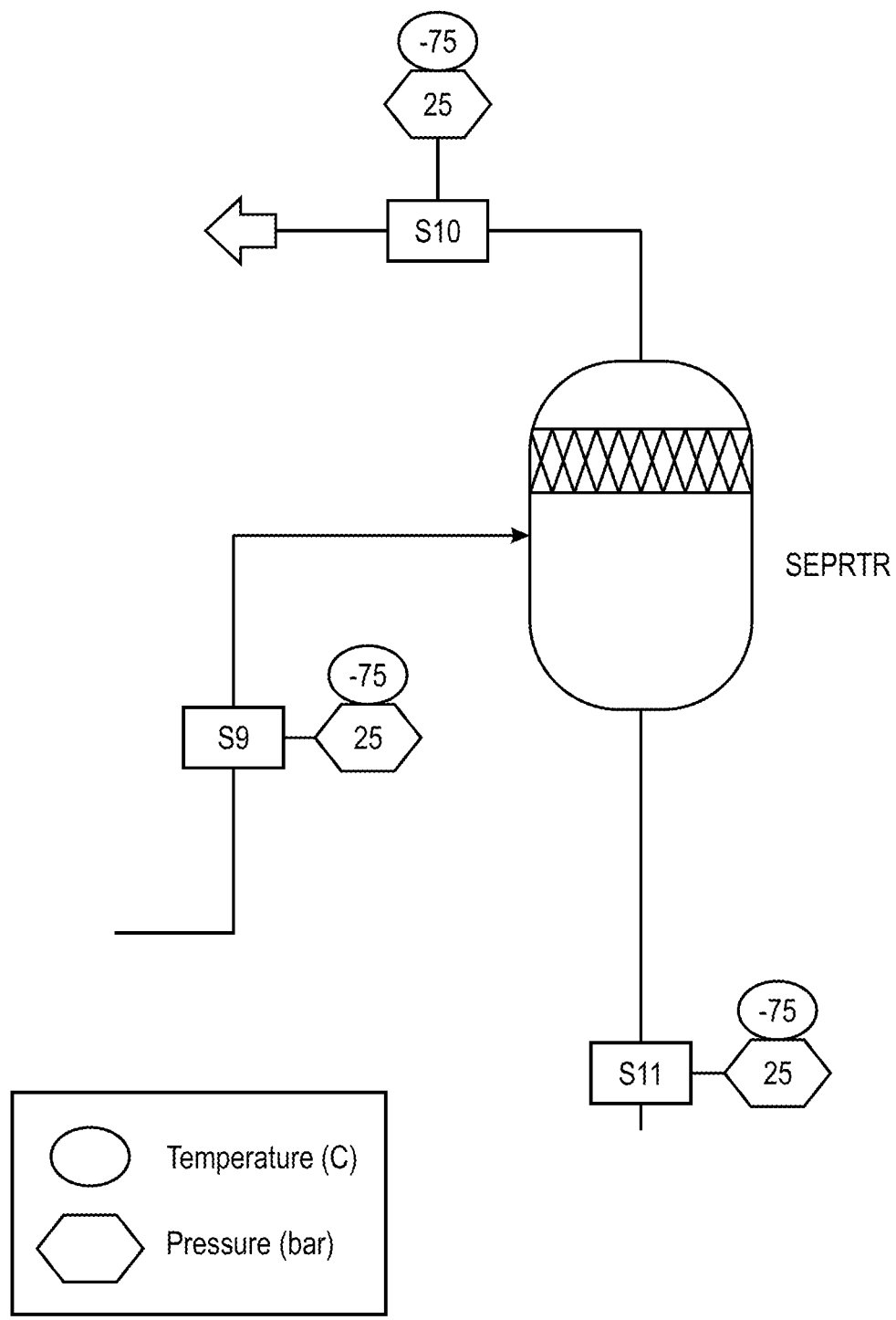
FIG. 13 depicts a schematic of a system used in a simulation.

Aspen Plus was used to simulate the flow schemes depicted in FIGS. 9 and 10, and the simulations are shown in FIGS. 11 and 12, respectively. The Peng Robinson property package was used for the simulations and a separator as an equilibrium stage was assumed. FIG. 13 depicts an expanded view of the separator from FIG. 12. In FIGS. 12 and 13, the stream S10 represents the hydrogen stream from the separator, and the stream S11 represents the ammonia stream from the separator to be recycled back as the ammonia sweep gas.

Figure 14:
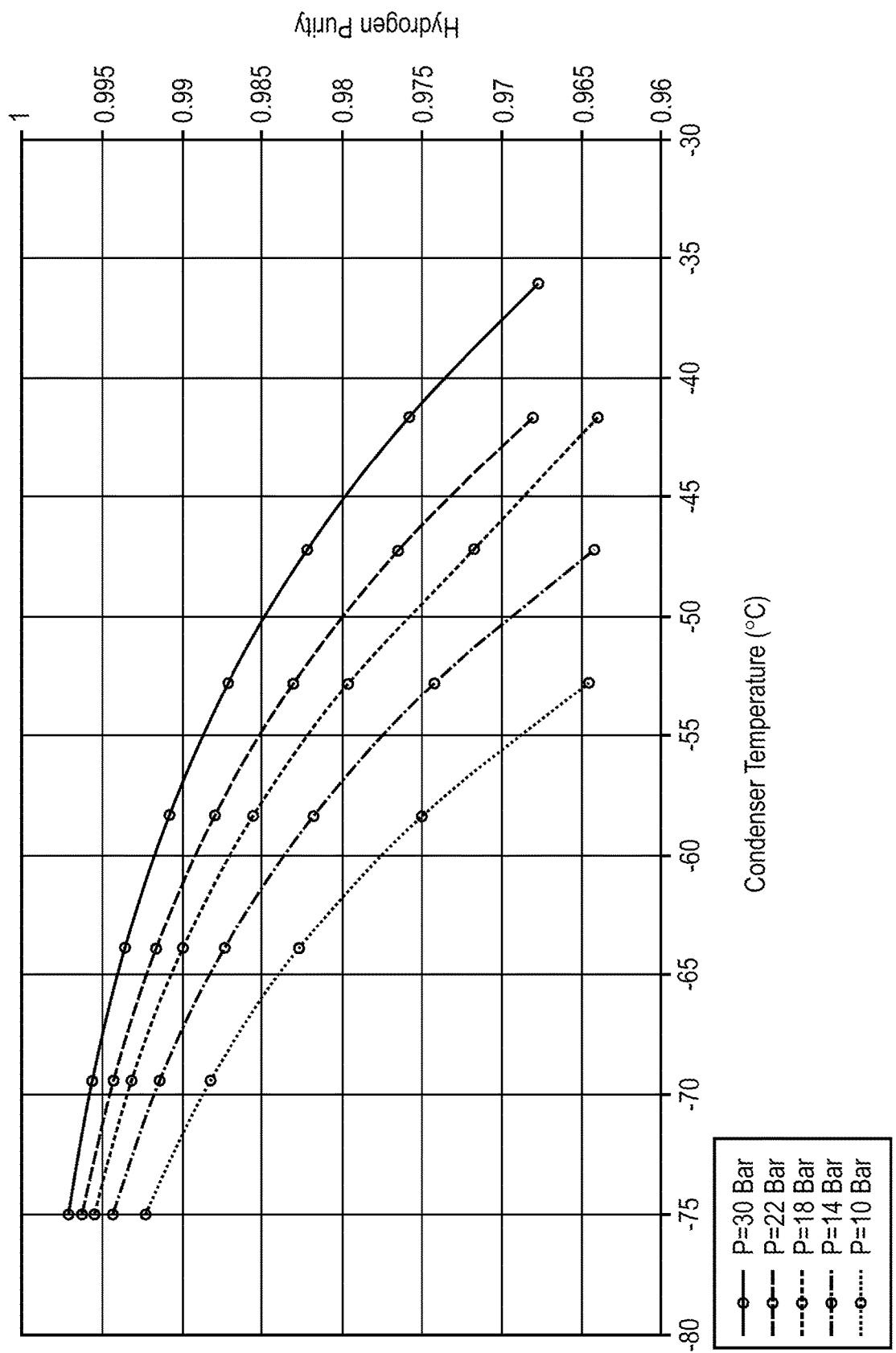
FIG. 14 depicts results obtained from a simulation.

The process simulations were used to estimate the temperature and pressure combinations in the separator to achieve the targeted hydrogen purity in the product stream from the separator. FIG. 14 depicts the hydrogen purities for various temperatures and pressures of the separator of FIG. 13.

Other Embodiments

While certain embodiments have been disclosed above, the disclosure is not limited to such embodiments.

As an example, while embodiments have been disclosed that include the components of the systems 1000, 2000, 3000, 9000 and 10000 depicted in FIGS. 1, 2, 3, 9 and 10, respectively; the disclosure is not limited to such embodiments. For example, the system 1000, 2000, 3000, 9000 and/or 10000 can contain one or more additional components not depicted. Additionally, or alternatively, the system 1000, 2000, 3000, 9000 and/or 10000 may not contain each component depicted. Further, components of the system 1000, 2000, 3000, 9000 and/or 10000 may be reconfigured as appropriate.

As an additional example, while embodiments have been disclosed that include reactors with tubular/cylindrical membranes, the disclosure is not limited to such embodiments. For example, in some embodiments, the reactors can include planar membranes.

As another example, in some embodiments, an electrically heated furnace can be used to supply the energy for the conversion of ammonia to hydrogen and nitrogen.

As another example, in some embodiments, the systems and methods include an ammonia polisher to enhance the purity of hydrogen (e.g. at least 90%, at least 95%, at least 98%, at least 99%, at least 99.5%, at least 99.8%, at least 99.9% and/or at most 99.995%). In some embodiments, the purity of hydrogen is compatible with fuel cell applications.

What is claimed:

1. A system, comprising:
   a reactor comprising a first portion and a second portion, the first and second portions separated by a hydrogen-permeable membrane;
   a first ammonia source configured to be in fluid communication with the first portion of the reactor;
   a second ammonia source configured to be in fluid communication with the second portion of reactor; and
   a heat source,
   wherein the system is configured so that, during use of the system:
      the first ammonia source supplies ammonia to the first portion of the reactor;
      the heat source heats the ammonia in the first portion of the reactor so that the ammonia in the first portion of the reactor is converted to hydrogen and nitrogen;
      the hydrogen passes through the hydrogen-permeable membrane and enters the second portion of the reactor; and
      the second ammonia source supplies ammonia to the second portion of the reactor in the form of a gas stream that removes the hydrogen from the second portion of the reactor.

2. The system of claim 1, wherein the first ammonia source is the same as the second ammonia source.

3. The system of claim 1, further comprising:
   a first cylinder comprising the hydrogen-permeable membrane; and
   a second cylinder that surrounds the first cylinder.

4. The system of claim 3, wherein:
   an interior space of the first cylinder defines the first portion of the reactor; and
   an annular space formed between an exterior surface of the first cylinder and an interior surface of the second cylinder defines the second portion of the reactor.

5. The system of claim 3, wherein:
   an interior space of the first cylinder defines the second portion of the reactor; and
   an annular space formed between an exterior surface of the first cylinder and an interior surface of the second cylinder defines the first portion of the reactor.

6. The system of claim 3, comprising a plurality of first and second cylinders.

7. The system of claim 1, further comprising a catalyst disposed in the first portion of the reactor.

8. The system of claim 1, wherein the hydrogen-permeable membrane comprises a planar hydrogen-permeable membrane.

9. The system of claim 1, further comprising a cooler, a compressor, and a condenser in fluid communication with an outlet of the second portion of the reactor.

10. The system of claim 9, further comprising a separator, capable of separating ammonia and hydrogen, in fluid communication with an outlet of the condenser,
    wherein the ammonia from the separator forms a third ammonia source.

11. The system of claim 10, wherein
    the third ammonia source comprises a contaminant; and
    the contaminant is removed from the third ammonia source.

12. The system of claim 11, wherein the third ammonia source is configured to be in fluid communication with the second portion of reactor.

13. The system of claim 12, wherein the third ammonia source supplies ammonia to the second portion of the reactor in the form of a gas stream that removes the hydrogen from the second portion of the reactor.

14. A system, comprising:
    a reactor comprising a first portion and a second portion, the first and second portions separated by a hydrogen-permeable membrane;
    a first ammonia source configured to be in fluid communication with the first portion of the reactor;
    a second ammonia source configured to be in fluid communication with the second portion of reactor;
    a first cylinder comprising the hydrogen-permeable membrane; and
    a second cylinder that surrounds the first cylinder.

15. The system of claim 14, wherein the first ammonia source is the same as the second ammonia source.

16. The system of claim 14, further comprising a cooler, a compressor, and a condenser in fluid communication with an outlet of the second portion of the reactor.

17. The system of claim 16, further comprising a separator, capable of separating ammonia and hydrogen, in fluid communication with an outlet of the condenser,
    wherein the ammonia from the separator forms a third ammonia source.

18. A system, comprising:
    a reactor comprising a first portion and a second portion, the first and second portions separated by a hydrogen-permeable membrane;
    a first ammonia source configured to be in fluid communication with the first portion of the reactor;
    a second ammonia source configured to be in fluid communication with the second portion of reactor;

a cooler;

a compressor; and a condenser in fluid communication with an outlet of the second portion of the reactor.

19. The system of claim 18, wherein the first ammonia source is the same as the second ammonia source.

* * * * *